United States Patent
Takeda et al.

(10) Patent No.: US 9,506,505 B2
(45) Date of Patent: Nov. 29, 2016

(54) MALFUNCTION DETECTION APPARATUS AND HYBRID VEHICLE

(71) Applicant: HONDA MOTOR CO., LTD., Tokyo (JP)

(72) Inventors: Yohei Takeda, Wako (JP); Hideaki Tsukahara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 33 days.

(21) Appl. No.: 14/440,229

(22) PCT Filed: Oct. 31, 2013

(86) PCT No.: PCT/JP2013/079579
§ 371 (c)(1),
(2) Date: May 1, 2015

(87) PCT Pub. No.: WO2014/073449
PCT Pub. Date: May 15, 2014

(65) Prior Publication Data
US 2015/0300423 A1 Oct. 22, 2015

(30) Foreign Application Priority Data

Nov. 6, 2012 (JP) .................. 2012-244400

(51) Int. Cl.
*B60K 6/387* (2007.10)
*B60K 6/442* (2007.10)
*F16D 48/02* (2006.01)
(Continued)

(52) U.S. Cl.
CPC .............. *F16D 25/14* (2013.01); *B60K 6/387* (2013.01); *B60K 6/442* (2013.01); *B60W 10/02* (2013.01);
(Continued)

(58) Field of Classification Search
CPC ..... B60W 20/20; B60K 6/442; B60K 6/387; B60K 3/38; B60K 3/22; B60K 3/20
USPC ......................................................... 701/22
See application file for complete search history.

(56) References Cited

U.S. PATENT DOCUMENTS 5,951,115 A * 9/1999 Sakai ...................... B60T 8/267
303/152
2004/0106495 A1* 6/2004 Abusamra ............. B60W 10/02
477/70
(Continued)

FOREIGN PATENT DOCUMENTS

DE 102004012158 A1 9/2005
JP S59-208230 A 11/1984
(Continued)

OTHER PUBLICATIONS

Office Action dated Jun. 14, 2016, issued in counterpart Korean Patent Applicaton No. 10-2015-7011803. (5 pages).
(Continued)

*Primary Examiner* — Thomas G Black
*Assistant Examiner* — Sara Lewandroski
(74) *Attorney, Agent, or Firm* — Westerman, Hattori, Daniels & Adrian, LLP

(57) ABSTRACT

An engaging and disengaging controller for controlling the engagement and disengagement of a power transmission path by supplying a working oil of a predetermined pressure to an engaging and disengaging mechanism includes a valve for opening and closing a flow path of the working oil, and an opening/closing detection section which detects an opened or closed state of the valve. A malfunction detection apparatus for the engaging and disengaging controller includes an opening/closing control section for the valve, a time counting section which counts a predetermined time from the start of an opening/closing control, and a malfunction detection section which determines that the engaging and disengaging controller malfunctions in the case where the time counting section ends counting in such a state that the results of a detection by the opening/closing detection section do not coincide with the details of a control executed by the opening/closing control section.

7 Claims, 16 Drawing Sheets

(51) Int. Cl.
  *B60W 10/02*   (2006.01)
  *B60W 20/00*   (2016.01)
  *F16H 61/12*   (2010.01)
  *F16D 25/12*   (2006.01)
  *F16D 48/06*   (2006.01)

(52) U.S. Cl.
  CPC .............. *B60W 20/00* (2013.01); *B60W 20/50* (2013.01); *F16D 25/12* (2013.01); *F16D 48/06* (2013.01); *F16H 61/12* (2013.01); *F16D 2500/1066* (2013.01); *F16D 2500/1085* (2013.01); *F16D 2500/10412* (2013.01); *F16D 2500/3026* (2013.01); *F16D 2500/3056* (2013.01); *F16D 2500/3067* (2013.01); *F16D 2500/3108* (2013.01); *F16D 2500/3166* (2013.01); *F16D 2500/5102* (2013.01); *F16D 2500/5108* (2013.01); *F16D 2500/525* (2013.01); *Y02T 10/6234* (2013.01); *Y10S 903/914* (2013.01)

(56) References Cited

U.S. PATENT DOCUMENTS

| | | | |
|---|---|---|---|
| 2005/0245349 A1* | 11/2005 | Tabata | B60K 6/38 477/3 |
| 2006/0180128 A1* | 8/2006 | Saito | F02D 41/221 123/525 |
| 2007/0049457 A1* | 3/2007 | Sato | F16H 61/12 477/97 |
| 2008/0006467 A1* | 1/2008 | Morishita | B60K 6/365 180/365 |
| 2009/0306867 A1* | 12/2009 | Nagashima | F16H 61/12 701/59 |
| 2012/0191310 A1* | 7/2012 | Whitton | F16D 48/066 701/68 |

FOREIGN PATENT DOCUMENTS

| | | | |
|---|---|---|---|
| JP | S59208230 A * | 11/1984 | ............ F16D 48/02 |
| JP | 8-93794 A | 4/1996 | |
| JP | 10-44953 A | 2/1998 | |
| JP | 2004-232732 A | 8/2004 | |
| JP | 2007-57057 A | 3/2007 | |
| JP | 2007-320388 A | 12/2007 | |
| JP | 2009-002401 A | 1/2009 | |
| WO | 2006/136140 A1 | 12/2006 | |

OTHER PUBLICATIONS

Extended (Supplementary) European Search Report (EESR) dated Jun. 3, 2016. (7 pages).
International Search Report dated Dec. 10, 2013 issued in corresponding application No. PCT/JP2013/079579.

* cited by examiner

MALFUNCTION DETECTION APPARATUS AND HYBRID VEHICLE

TECHNICAL FIELD

The present invention relates to a malfunction detection apparatus of an engaging and disengaging controller that supplies a working oil of a predetermined pressure to an engaging and disengaging mechanism which engages and disengages a power transmission path to control engagement and disengagement of the power transmission path, and a hybrid vehicle.

BACKGROUND ART

An automatic transmission which is mounted on a vehicle includes a plurality of frictional engagement elements such as clutches or brakes and realizes a plurality of speed gears by combining application and release of the frictional engagement elements. The automatic transmission includes a hydraulic circuit for supplying a working pressure individually to the frictional engagement elements. An hydraulic switch is provided in the hydraulic circuit for detecting a working pressure applied to the frictional engagement elements. Information of the hydraulic pressure detected by the hydraulic switch is used for feedback control of the working pressure.

In the automatic transmission, in the event that a further frictional engagement element is applied in addition to a preset application of a predetermined frictional engagement element, interlocking may be generated as a result of the simultaneous application. Therefore, a possibility of generation of the interlocking is determined based on the information on the hydraulic pressure detected by the hydraulic switch or the like. Further, a fail-safe operation in which the transmission is fixed to a predetermined speed gear is executed as a measure for avoiding the interlocking.

In the case where an electric system such as the hydraulic switch malfunctions, there may occur a case where the appropriate control of the working pressure that is applied to the frictional engagement elements becomes difficult and the possibility of generation of the interlocking is erroneously determined. A fail-safe operation to be executed as a measure for avoiding the erroneously determined interlocking is originally unnecessary. It is necessary to confirm whether or not the electric system such as the hydraulic switch operates normally in order to avoid as many unnecessary fail-safe operations like such an unnecessary one as possible.

A malfunction detection apparatus described in Patent Literature 1 detects a malfunction of a hydraulic switch in an automatic transmission quickly and clearly. Namely, the malfunction detection apparatus detects a state of the hydraulic switch when an ignition switch is on before an engine is started and determines that the hydraulic switch malfunctions in the event that the hydraulic switch continues to be on until a timer value TB reaches a predetermined value Tb. In this way, the state of the hydraulic switch is determined in such a state that no hydraulic pressure is surely generated before the start of the engine.

RELATED ART LITERATURE

Patent Literature

Patent Literature 1: JP-2007-57057-A1

SUMMARY OF THE INVENTION

Problem that the Invention is to Solve

An improvement of the performance of an automatic transmission in which frictional engagement elements are quickly applied or released conflicts with an allocation of a time necessary to detect a malfunction of a shift valve or a hydraulic switch of a hydraulic circuit provided in the hydraulic circuit. Namely, the detection of a malfunction of a hydraulic switch or the like using a timer results in calls for a reduction in response of the automatic transmission in changing speed gears. In this way, it is difficult to make keeping the good or proper response of the automatic transmission in changing the speed gears compatible with ensuring the degree of certainty of detection of a malfunction of the hydraulic circuit.

An object of the invention is to provide a malfunction detection apparatus for an engaging and disengaging controller which can make the response of an engaging and disengaging mechanism compatible with the degree of certainty of detection of a malfunction of the engaging and disengaging controller, and a hybrid vehicle.

Means for Solving the Problem

With a view to achieving the object, a malfunction detection apparatus of an invention according to claim 1 is a malfunction detection apparatus (for example, a management ECU 125 of an embodiment) for an engaging and disengaging controller (for example, a hydraulic circuit 117 of the embodiment) that supplies a working oil of a predetermined pressure to an engaging and disengaging mechanism (for example, a clutch 115 of the embodiment) which engages and disengages a power transmission path to control engagement and disengagement of the power transmission path, wherein the engaging and disengaging controller has: a valve (for example, shift valves 157A, 157B of the embodiment) for opening and closing a flow path of the working oil to the engaging and disengaging mechanism, and an opening/closing detection section (for example, hydraulic switches 161A, 161B of the embodiment) which detects an opened or closed state of the valve, and wherein the malfunction detection apparatus has: an opening/closing control section (for example, a valve A opening control section 223, a valve B opening control section 215, a valve A closing control section 303, a valve B closing control section 313 of the embodiment) which controls the valve of the engaging and disengaging controller to be opened or closed, a time counting section (for example, malfunction detection timers 225A, 217B, 305A, 315B of the embodiment) which counts a predetermined time from a start of an opening/closing control by the opening/closing control section, and a malfunction detection section (for example, malfunction detection sections malfunction detection sections 227A, 219B, 307A, 317B of the embodiment) which determines that the engaging and disengaging controller malfunctions in a case where the time counting section ends counting of the predetermined time in a state that detection results by the opening/closing detection section of the engaging and disengaging controller do not coincide with control details executed by the opening/closing control section.

Further, the malfunction detection apparatus of an invention according to claim 2 is the malfunction detection apparatus, wherein the predetermined time is a time which is equal to or longer than a time taken from when the valve is controlled to be opened or closed until the opening/closing detection section can detect an open state or a closed state of the valve, irrespective to a temperature of the working oil in the engaging and disengaging controller.

Further, the malfunction detection apparatus of an invention according to claim 3 is the malfunction detection apparatus, wherein in the engaging and disengaging controller, a plurality of the valves are provided in series on the flow path of the working oil, and a plurality of the opening/closing detection sections are provided corresponding to each of the valves, and wherein when the engaging and disengaging mechanism is applied, in the malfunction detection apparatus, the opening and closing control section controls the valves to be opened sequentially from those provided upstream of the flow path, the time counting section counts the predetermined time from the start of an opening control by the opening and closing control section every time each valve is controlled to be opened, and the malfunction detection section determines that the valve of the engaging and disengaging controller which is controlled to be opened or the opening/closing detection section corresponding to that valve malfunctions in a case where the time counting section ends counting in such a state that detection results by the opening/closing detection section do not coincide with control details executed by the opening/closing control section every time each valve is controlled to be opened.

Further, the malfunction detection apparatus of an invention according to claim 4 is the malfunction detection apparatus, wherein in the engaging and disengaging controller, a plurality of the valves are provided in series on the flow path of the working oil, and a plurality of opening/closing detection sections are provided corresponding to each of the valves, and wherein when the engaging and disengaging mechanism is released, in the malfunction detection apparatus, the opening and closing control section controls the valves to be closed sequentially from those provided downstream of the flow path, the time counting section counts the predetermined time from the start of a closing control by the opening and closing control section every time each valve is controlled to be closed, and the malfunction detection section determines that the valve of the engaging and disengaging controller which is controlled to be closed or the opening/closing detection section corresponding to that valve malfunctions in a case where the time counting section ends counting of the predetermined time in a state that detection results by the opening/closing detection section do not coincide with control details executed by the opening/closing control section every time each valve is controlled to be closed.

Further, the malfunction detection apparatus of an invention according to claim 5 is the malfunction detection apparatus, wherein the predetermined time is a time which is equal to or longer than a time taken from when the valve is controlled to be opened or closed until the opening/closing detection section can detect an open state or a closed state of the valve, and is a time which is set to be longer as a temperature of the working oil in the engaging and disengaging controller becomes lower.

Further, a hybrid vehicle of an invention according to claim 6 is a hybrid vehicle, including: an internal combustion engine (for example, an internal combustion engine 109 of the embodiment), a generator (for example, a generator 111 of the invention) which is driven by the internal combustion engine to generate electric power, a battery (for example, a battery 101 of the embodiment) which supplies electric power to a motor, the motor (for example, a motor 107 of the embodiment) which is connected to drive wheels (for example, drive wheels 129 of the embodiment) and which is driven by means of electric power supplied from at least either of the battery and the generator, an engaging and disengaging mechanism (for example, a clutch 115 of the embodiment) which engages and disengages a power transmission path from the internal combustion engine to the drive wheels and which can transmit rotational power from the internal combustion engine to the drive wheels when engaged, an engaging and disengaging controller (for example, a hydraulic circuit 117 of the embodiment) which supplies a working oil of predetermined pressure to the engaging and disengaging mechanism to control engagement or disengagement of the power transmission path, and the above-described malfunction detection apparatus (for example, the management ECU 125 of the embodiment), wherein the hybrid vehicle drives by means of power from the motor or the internal combustion engine, and wherein in shifting the hybrid vehicle from a drive mode in which the motor is used as a drive source to a drive mode in which the internal combustion engine is used as a drive source, the malfunction detection apparatus operates when the valve of the engaging and disengaging controller is operated to be opened to apply the engaging and disengaging mechanism.

Further, the hybrid vehicle of an invention according to claim 7 is the hybrid vehicle, wherein in shifting the hybrid vehicle from the drive mode in which the internal combustion engine is used as a drive source to the drive mode in which the motor is used as a drive source, the malfunction detection apparatus operates when the valve of the engaging and disengaging controller is operated to be closed to release the engaging and disengaging mechanism.

Advantage of the Invention

According to the malfunction detection apparatus of the invention according to claims 1 to 5 and the hybrid vehicle of the invention according to claims 6 to 7, the malfunction detection of the engaging and disengaging controller can be executed accurately when the engaging and disengaging mechanism is engaged or disengaged.

According to the malfunction detection apparatus of the invention according to claim 2, the predetermined time which the time counting section counts is set in consideration of the worst response of the working oil, and therefore, the malfunction detection of the engaging and disengaging controller is executed accurately irrespective of the temperature of the working oil.

According to the malfunction detection apparatus of the invention according to claim 5, the predetermined time which the time counting section counts is variable according the response of the working oil, and therefore, the malfunction of the engaging and disengaging controller can be executed accurately and quickly.

MODE FOR CARRYING OUT THE INVENTION

Hereinafter, an embodiment of the invention will be described by reference to the drawings.

An HEV (Hybrid Electrical Vehicle) includes a motor and an internal combustion engine and is driven by means of a driving force of the motor and/or the internal combustion engine according to the driving conditions of the vehicle. HEVs are divided roughly into two system types; a series system and a parallel system. A series system HEV is driven by means of the power of the motor. The internal combustion engine is used only to generate electric power. The electric power generated in a generator by means of the power of the internal combustion engine is used to charge a battery or is supplied to the motor.

A drive mode of the series system HEV includes two drive modes; an "EV drive mode" and an "ECVT drive mode." In the EV drive mode, the HEV is driven by means of a driving force of the motor which is driven by means of electric power which is supplied from the battery. In the EV drive mode, the internal combustion engine is not drive. In the ECVT drive mode, the HEV is driven by means of a driving force of the motor which is driven by means of electric power supplied from both the battery and the generator or electric power supplied from only the generator. In the ECVT drive mode, the internal combustion engine is driven to drive the generator which generates electric power.

A parallel system HEV is driven by means of a driving force of either or both of the motor and the internal combustion engine. In particular, a drive mode in which the parallel system HEV is driven by means of only a driving force of the internal combustion engine is referred to as an "over-drive (OD) drive mode."

A series/parallel system HEV is also known in which both the series and parallel systems are combined. In the series/parallel system, a clutch is released or applied (disengaged or engaged) according to the driving conditions of the vehicle, whereby a transmission system of driving force is switched to either the series system or the parallel system. In particular, the clutch is released to switch the drive system to the series system when the vehicle is accelerated in the low to middle speed range, whereas the clutch is applied to switch the drive system to the parallel system when the vehicle is driven at constant speeds (cruising) in the middle to high speed range.

Figure 1:
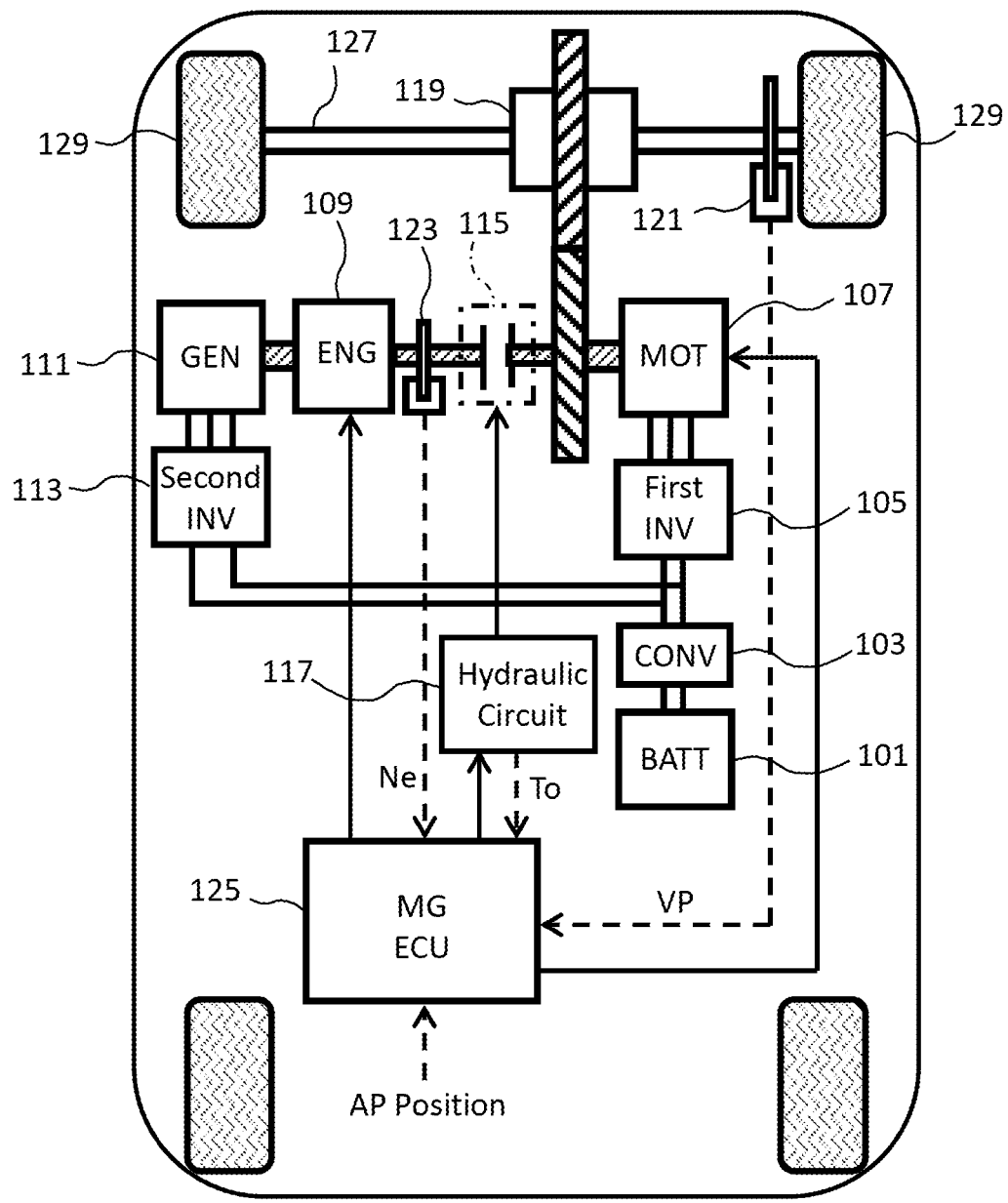
FIG. 1 is a block diagram showing an internal configuration of a series/parallel system HEV.

FIG. 1 is a block diagram showing an internal configuration of a series/parallel system HEV. As shown in FIG. 1, a series/parallel system HEV (hereinafter, referred to simply as a "vehicle") includes a battery (BATT) 101, a converter (CONV) 103, a first inverter (first INV) 105, a motor (Mot) 107, an internal combustion engine (ENG) 109, a generator (GEN) 111, a second inverter (second INV) 113, a lock-up clutch (hereinafter, referred to simply as a "clutch") 115, a hydraulic circuit 117, a gearbox (hereinafter, referred to simply as a "gear") 119, a vehicle speed sensor 121, a rotation speed sensor 123, and a management ECU (MG ECU) 125. In FIG. 1, arrows shown by a dotted line indicate flows of value data, and arrows shown by a solid line indicate flows of control signal that signal instructions.

The battery 101 has a plurality of battery cells which are connected in series and supplies a high voltage in the range of 100 to 200V, for example. The battery cells are, for example, lithium ion battery cells or nickel-metal hydride battery cells. The converter 103 increases or decreases a direct current output voltage of the battery 101 as the voltage outputted remains direct current. The first inverter 105 converts DC voltage into AC voltage and supplies a threephase current to the motor 107. The first inverter 105 also converts AC voltage which is inputted when regenerative braking is performed in the motor 107 into DC voltage for charging the battery 101.

The motor 107 generates power which drives the vehicle. Torque generated in the motor 107 is transmitted to a drive shaft 127 by way of the gear 119. A rotor of the motor 107 is directly connected to the gear 119. In addition, the motor 107 operates as a generator when regenerative braking is performed therein, and the power generated in the motor 107 is used to charge the battery 101.

The internal combustion engine 109 is used only to drive the generator ill when the clutch 115 is released, causing the vehicle to be driven based on the series drive system or series driven. However, when the clutch 115 is applied, the output of the internal combustion engine 109 is transmitted to the drive shaft 127 by way of the generator 111, the clutch 115 and the gear 119 as mechanical energy which drives the vehicle.

The generator 111 is driven by the power of the internal combustion engine 109 to generate electric power. The electric power generated by the generator 111 is used to charge the battery 101 or is supplied to the motor 107 by way of the second inverter 113 and the first inverter 105. The second inverter 113 converts AC voltage generated by the generator ill into DC voltage. The electric power converted by the second inverter 113 is used to charge the battery 101 or is supplied to the motor 107 via the first inverter 105.

The clutch 115 engages or disengages a driving force transmission path from the internal combustion engine 109 to drive wheels 129 based on an instruction from the management ECU 125. The hydraulic circuit 117 supplies a predetermined working pressure to the clutch 115 via a working oil. The hydraulic circuit 117 sends a signal which indicates a temperature To of the working oil to the management ECU 125 via a motor ECU (not shown).

The gear 119 is a one-speed fixed gear which corresponds, for example, to a fifth gear. Consequently, the gear 119 converts a driving force from the motor 107 into a rotation speed and torque at a specific gear ratio and transmits them to the drive shaft 127. The vehicle speed sensor 121 detects a driving speed (a vehicle speed VP) of the vehicle. A signal that indicates the vehicle speed VP detected by the vehicle speed sensor 121 is sent to the management ECU 125. The rotation speed sensor 123 detects a rotation speed Ne of the internal combustion engine 109. A signal which indicates the rotation speed Ne detected by the rotation speed sensor 123 is sent to the management ECU 125.

The management ECU 125 calculates a rotation speed of the motor 107 based on the vehicle speed VP, engages or disengages the clutch 115 by using the hydraulic circuit 117, switches the drive modes, and controls the motor 107, the internal combustion engine 109 and the generator 111. The management ECU 125 will be described in detail later.

Figure 2:
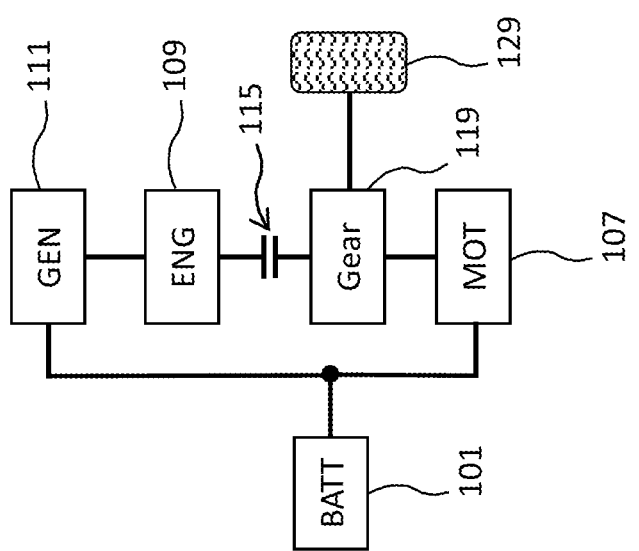
FIG. 2 is a diagram showing schematically a main part of a driving system of the vehicle shown in FIG. 1.
Figures 3A, 3B, 3C:
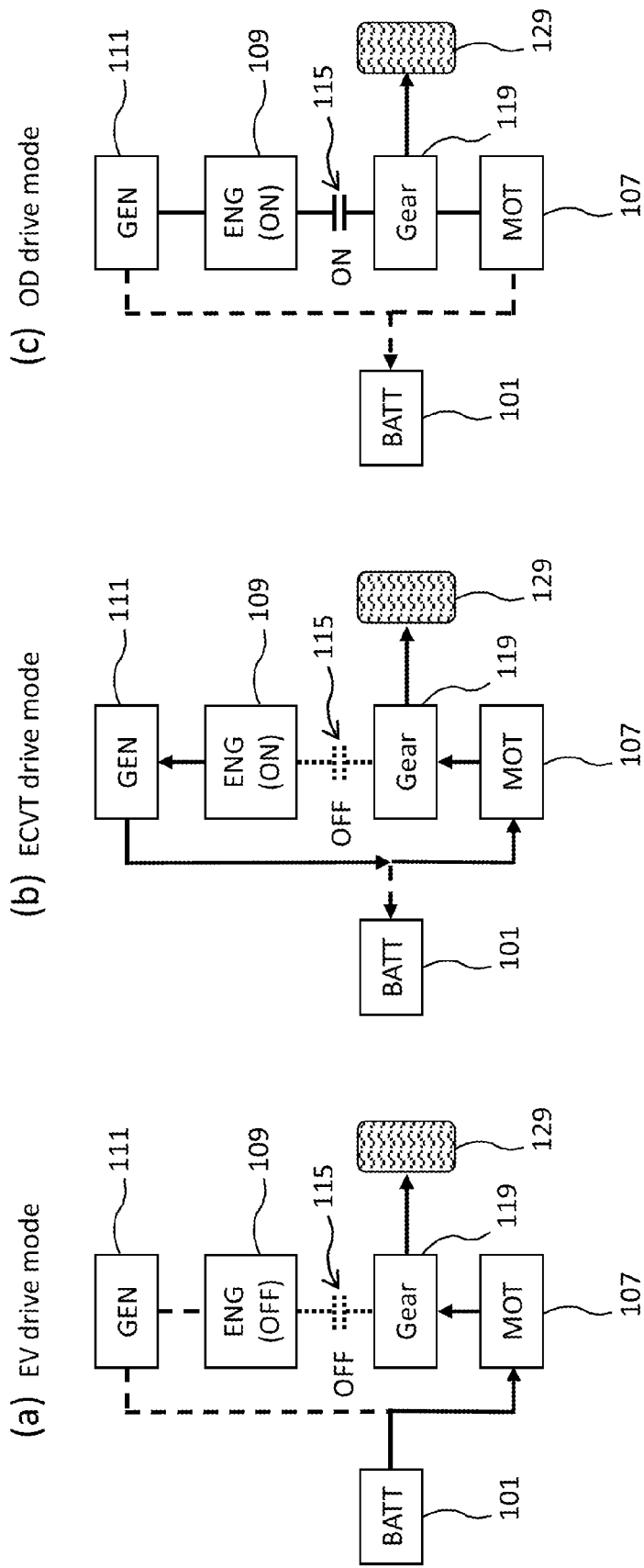
FIG. 3A is a diagram showing a driving state when the vehicle is driven in an EV drive mode.
FIG. 3B is a diagram showing a driving state when the vehicle is driven in an ECVT drive mode.
FIG. 3C is a diagram showing a driving state when the vehicle is driven in an OD drive mode.

FIG. 2 is a diagram showing schematically a main part of a driving system of the vehicle shown in FIG. 1. FIG. 3A is a diagram showing a driving state when the vehicle is in the EV drive mode. FIG. 3B is a diagram showing a driving state when the vehicle is in the EVCT drive mode. FIG. 3C is a diagram showing a driving state when the vehicle is in the OD drive mode.

In the vehicle which is driven in the EV drive mode, as shown in FIG. 3A, the clutch 115 is released, and the internal combustion engine 109 is stopped. The vehicle is driven by means of the driving force of the motor 107 which is driven by electric power supplied from the battery 101. In the vehicle which is driven in the ECVT drive mode, as shown in FIG. 3B, the clutch 115 is released, and the internal combustion engine 109 is driven to supply enough electric power for the motor 107 to output a required output based on an accelerator pedal position (AP position) and a vehicle speed. The vehicle is driven by means of the driving force of the motor 107 which is driven by electric power supplied from the generator which generates electric power according to the power outputted from the internal combustion engine 109. In the vehicle which is driven in the OD drive mode, as shown in FIG. 3C, the clutch 115 is applied, and the vehicle is driven by means of the driving force of the internal combustion engine 109.

As described above, the drive mode of the vehicle is set to the EV drive mode with the clutch 115 released when the vehicle is acceleration in the low to middle speed range. The drive mode is set to the OD drive mode with the clutch 115 applied when the vehicle is driven at constant speeds (cruising) in the middle to high speed range. The drive mode is set to the ECVT drive mode with the clutch 115 released when the vehicle is accelerated in the middle to high speed range. The drive mode is set after the management ECU 125 shown in FIG. 1 determines on a drive phase based on the accelerator pedal position (AP position) and the vehicle speed. For example, when a drive phase of the vehicle changes from a "start and acceleration drive" phase to a "middle constant-speed drive" phase, the management ECU 125 applies the clutch 115 and switches the drive mode from the "EV drive mode" to the "OD drive mode." When the drive phase changes from the "middle constant-speed drive" phase to a "passing acceleration drive" phase, the management ECU 125 switches the drive mode from the "OD drive mode" to the "ECVT drive mode."

The management ECU 125 executes a malfunction detection of the hydraulic circuit 117 when it applies or releases the clutch 115 to switch the drive modes. Hereinafter, the configuration of the hydraulic circuit 117 will be described in detail, whereafter the malfunction detection of the hydraulic circuit 117 by the management ECU 125 will be described.

(Configuration of Hydraulic Circuit)

Figure 4:
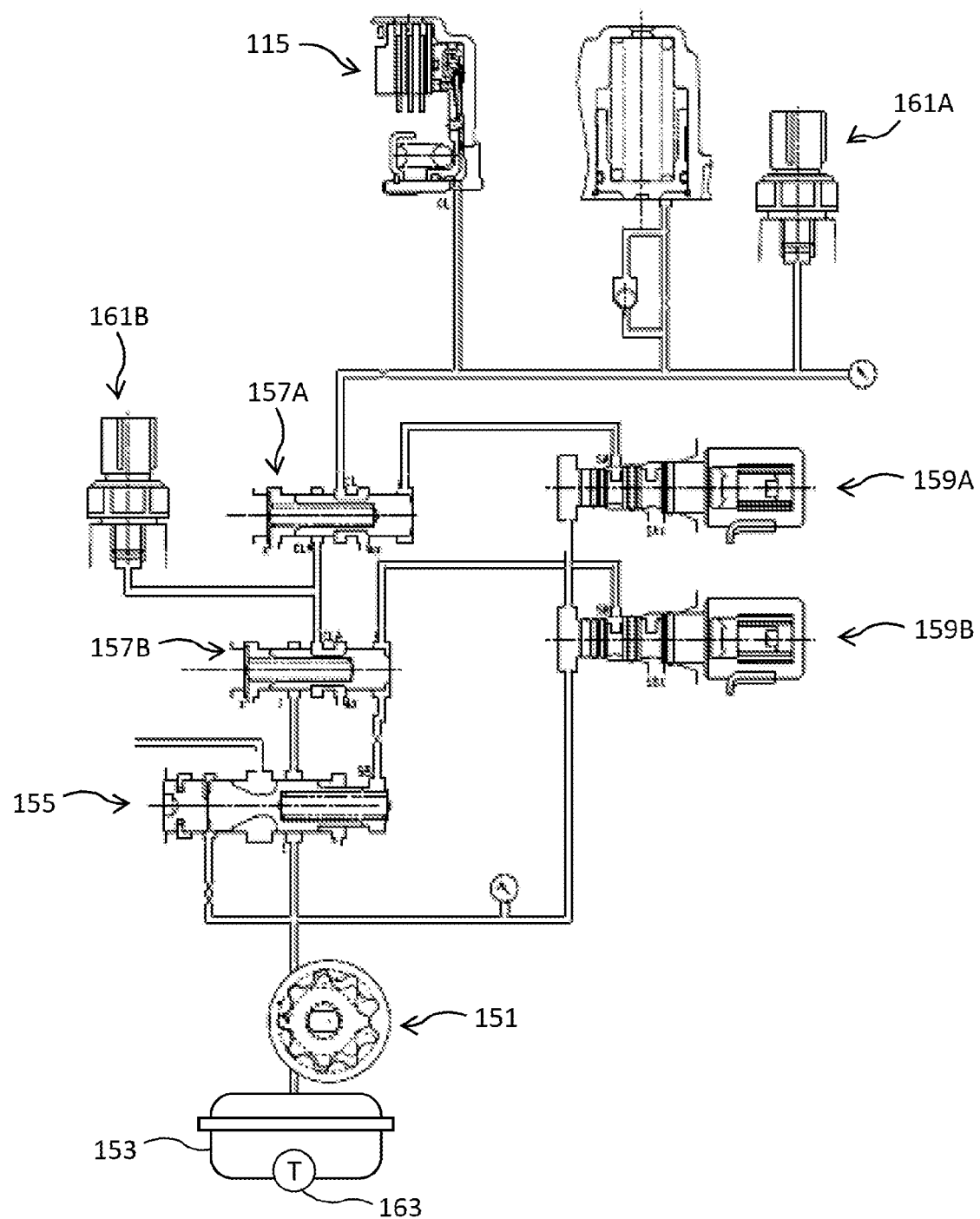
FIG. 4 is a diagram showing an internal configuration of a hydraulic circuit 117 and a relationship between the hydraulic circuit 117 and a clutch 115.

FIG. 4 is a diagram showing an internal configuration of the hydraulic circuit 117 and a relationship between the hydraulic circuit 117 and a clutch 115. As shown in FIG. 4, the hydraulic circuit 117 supplies a working oil which is discharged from an oil tank 153 by an oil pump 151 to the clutch 115 by way of a regulator valve 155 and two shift valves 157A, 157B. The shift valves 157A, 157B are provided on a pump oil path which extends from the regulator valve 155 to the clutch 115, and the shift valve 157A is provided on a downstream side of the pump oil path, and the shift valve 157B is provided on an upstream side thereof.

The shift valve 157A is opened and closed by a shift solenoid 159A, and the shift valve 157B is opened and closed by a shift solenoid 159B. The shift solenoids 159A, 159B are individually controlled to be energized by the management ECU 125. When the shift solenoids are energized, the shift valves are opened, and when the shift solenoids are deenergized, the shift valves are closed. Consequently, when the shift solenoids 159A, 159B are energized, the shift valves 157A, 157B are opened, whereby the clutch 115 is applied by means of the pressure of the working oil.

The hydraulic circuit 117 includes a hydraulic switch 161A which detects an opening or closure of the shift valve 157A and a hydraulic switch 161B which detects an opening or closure of the shift valve 157B. The hydraulic switch 161A sends a signal which indicates an opened or closed state of the shift valve 157A which corresponds to a pressure downstream of the shift valve 157A in the pump oil path to the management ECU 125. The hydraulic switch 161B sends a signal which indicates an opened or closed state of the shift valve 157B which corresponds to a pressure downstream of the shift valve 157B and upstream of the shift valve 157A in the pump oil path to the management ECU 125. Signals indicating the opened or closed states of the shift valves 157A, 157B which are sent from the hydraulic switches 161A, 161B are represented by 1 or 0. In the case where the signals are 1, they signal that the shift valves are open, and on the contrary, in the case where the signals are 0, they signal that the shift valves are closed.

Further, the hydraulic circuit 117 includes an oil temperature sensor 163 which detects a temperature of the working oil (hereinafter, referred to as a "oil temperature"). A signal indicating an oil temperature To detected by the oil temperature sensor 163 is sent to the management ECU 125 via a motor ECU (not shown).

(Malfunction Detection when Clutch is Applied)

Figure 5:
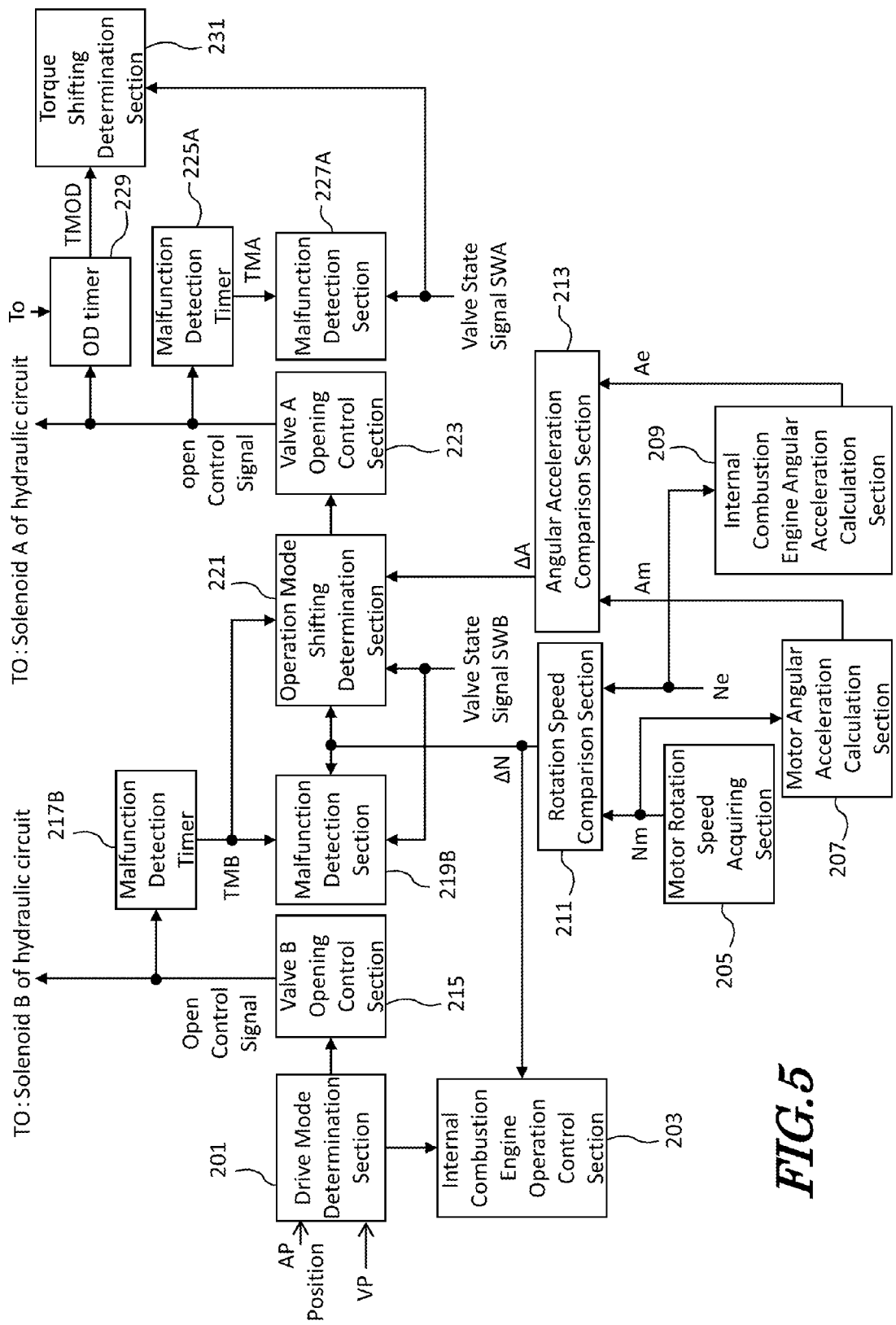
FIG. 5 is a block diagram showing an internal configuration of a management ECU 125 of a first embodiment which executes a malfunction detection of the hydraulic circuit 117 when the clutch 115 is applied.

FIG. 5 is a block diagram showing an internal configuration of the management ECU 125 of the first embodiment which executes a malfunction detection of the hydraulic circuit 117 when the clutch 115 is applied. As shown in FIG. 5, the management ECU 125 includes a drive mode determination section 201, an internal combustion engine operation control section 203, a motor rotation speed acquiring section 205, a motor angular acceleration calculation section 207, an internal combustion engine angular acceleration calculation section 209, a rotation speed comparison section 211, an angular acceleration comparison section 213, a valve B opening control section 215, a malfunction detection timer 217B, a malfunction detection section 219B, an operation mode shifting determination section 221, a valve A opening control section 223, a malfunction detection timer 225A, a malfunction detection section 227A, an OD timer 229, and a torque shift determination section 231.

The drive mode determination section 201 determines the drive mode of the vehicle to be anyone of the "EV drive mode," the "ECVT drive mode." and the "OD drive mode" based on an accelerator pedal position (AP position) and a vehicle speed VP. The configuration of the management ECU 125 shown in FIG. 5 is one when the drive mode is switched from the ECVT drive mode to the OD drive mode, and therefore, the drive mode determination section 201 shown in FIG. 5 determines that the drive mode of the vehicle is the "OD drive mode."

The internal combustion engine operation control section 203 controls the operation of the internal combustion engine 109 after the drive mode determination section 201 determines that the drive mode of the vehicle is the OD drive mode. The internal combustion engine operation control section 203 executes a rotation speed matching on the internal combustion engine 109 by using the generator 111 so that the rotation speed Ne of the internal combustion engine 109 approaches the rotation speed Nm of the motor 107 during a shift period when the drive mode is shifting from the ECVT drive mode to the OD drive mode.

The motor rotation speed acquiring section 205 acquires a rotation speed Nm of the motor 107 measured by a resolver, not shown. The motor angular acceleration calculation section 207 calculates an angular acceleration Am of the motor 107 from the rotation speed Nm acquired by the motor rotation speed acquiring section 205. The internal combustion engine angular acceleration calculation section 209 calculates an angular acceleration Ae of the internal combustion engine 109 from the rotation speed Ne of the internal combustion engine 109. The rotation speed Ne of the internal combustion engine 109 is equal to a rotation speed of the generator 111 which is measured by the resolver, not shown. The rotation speed comparison section 211 compares the rotation speed Nm of the motor 107 with the rotation speed Ne of the internal combustion engine 109 and calculates a differential rotation speed $\Delta N$ therebetween. The angular acceleration comparison section 213 compares the angular acceleration Am of the motor 107 with the angular acceleration Ae of the internal combustion engine 109 and calculates a differential acceleration $\Delta A$ therebetween.

The valve B opening control section 215 outputs an open control signal which opens the shift valve 157B of the hydraulic circuit 117 in the event that the drive mode determination section 201 determines that the drive mode is to be switched to the OD drive mode when the drive mode of the vehicle is the ECVT drive mode. This open control signal is sent to the shift solenoid 159B of the hydraulic circuit 117. The shift solenoid 159B is energized by the open control signal, whereby the shift valve 157B is opened.

Figure 6:
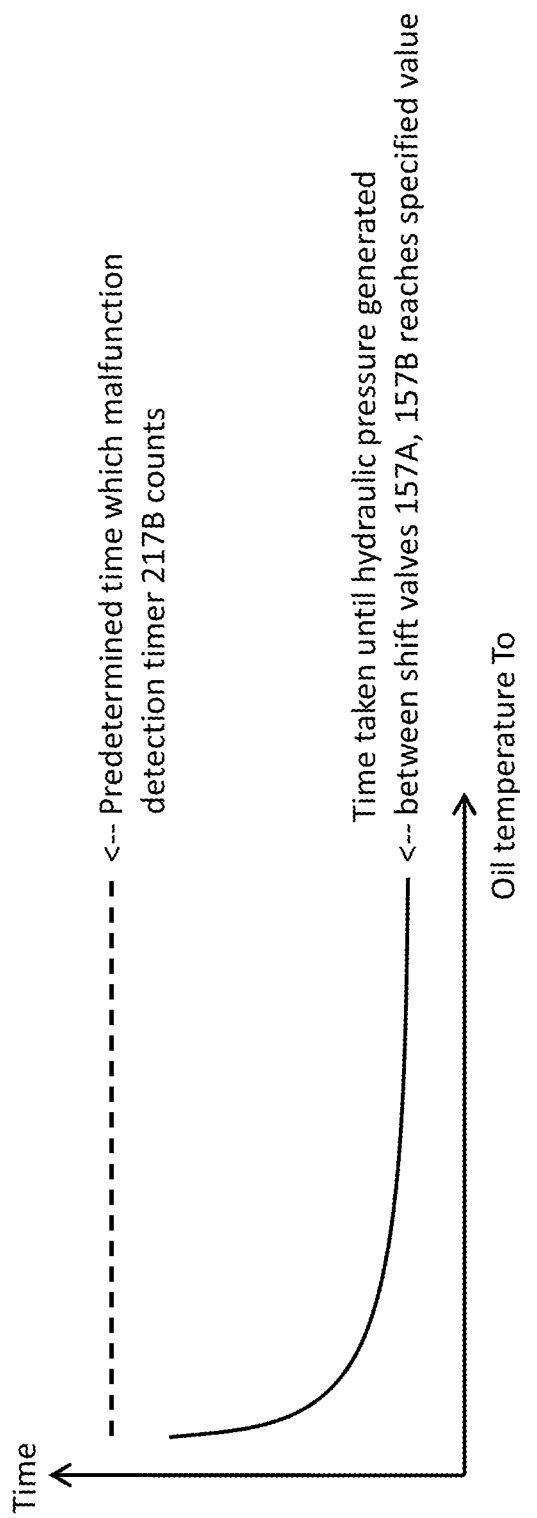
FIG. 6 is a graph showing a relationship between an oil temperature To and a time taken until a hydraulic pressure generated between shill valves 157A, 157B reaches a specified value and a predetermined time which a malfunction detection timer 217B counts.

The malfunction detection timer 217B counts a predetermined time from a point in time when the valve B opening control section 215 outputs the open control signal. FIG. 6 is a graph showing a relationship between the oil temperature To and a time taken until a hydraulic pressure generated between shift valves 157A, 157B reaches a specified value and the predetermined time which the malfunction detection timer 217B counts. As shown in FIG. 6, the predetermined time during which the malfunction detection timer 217B executes counting is the time based on the cryogenic response of the hydraulic pressure in the hydraulic circuit 117 and is the time which is sufficient for the hydraulic switch 161B to detect that the shift valve 157B is open from when the shift valve 157B is operated to be opened with the shift valve 157A staying off and the shift valve 157B staying off. A count execution signal TMB is outputted from the malfunction detection timer 217B. The count execution signal TMB is represented by "1" or "0." In the case where the count execution signal TMB is "1," it indicates that the malfunction detection timer 217B is counting, whereas in the case where the count execution signal TMB is "0," it indicates that the malfunction detection timer 217B has completed counting.

The malfunction detection section 219B determines that the shift valve 157B or the hydraulic switch 161B of the hydraulic circuit 117 malfunctions (an off malfunction) in the case where the count execution signal TMB from the malfunction detection timer 217B becomes 0 from "1" with a valve state signal SWB from the hydraulic switch 161B which indicates an opened or closed state of the shift valve 157B continuing to be 0 which indicates the closed state although the differential rotation speed $\Delta N$ calculated by the rotation speed comparison section 211 becomes a predetermined value or smaller. As has been described above, the predetermined time which the malfunction detection timer 217B counts is the time which is long enough for the shift valve 157B to open when the oil temperature is extremely low. Therefore, it is not a normal situation that the malfunction detection timer 217B ends counting with the valve state signal SWB continuing to be 0 which indicates the closed state although the shift valve 157B is controlled to be opened. The malfunction detection section 219B detects from this situation that the shift valve 157B or the hydraulic switch 161B of the hydraulic circuit 117 malfunctions (an off malfunction).

Figure 7:
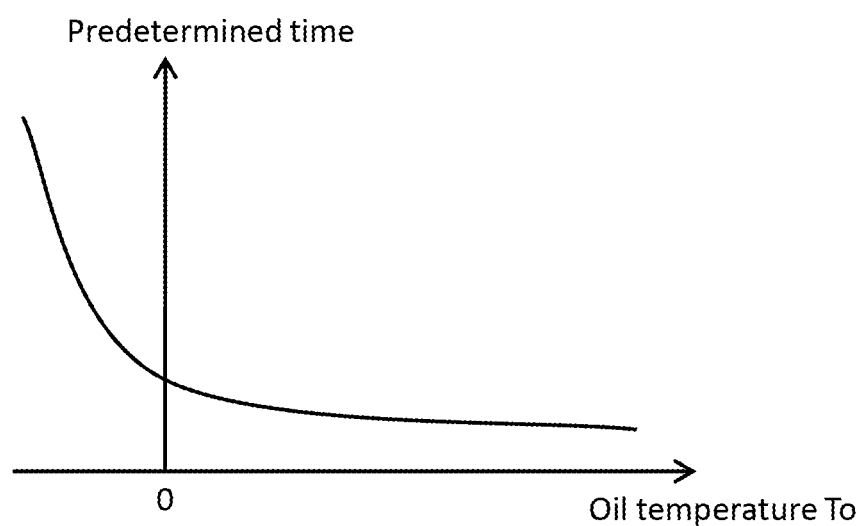
FIG. 7 is a graph showing a relationship between the predetermined time which the malfunction detection timer 217B counts and the oil temperature.

The time necessary for the malfunction detection section 219B to detect the open state of the shift valve 157B differs depending upon the temperature of the working oil (the oil temperature) in the hydraulic circuit 117. Namely, since the lower the oil temperature, the higher the viscosity of the working oil, the lower the oil temperature, the longer the sufficient time. Therefore, the predetermined time which the malfunction detection timer 217B counts is the time taken from when the shift valve 157B is operated to be opened until the hydraulic switch 161B can detect the open state of the shift valve 157B and may be the time which is set to be longer as the oil temperature becomes lower. FIG. 7 is a graph showing a relationship between the predetermined time which the malfunction detection timer 217B counts and the oil temperature. As shown in FIG. 7, in the event that the oil temperature is equal to or higher than normal temperatures, the predetermined time is set shorter than when the oil temperature is extremely low. Consequently, the malfunction detection by the malfunction detection section 219B can be executed quickly and accurately according to the oil temperature.

The operation mode shifting determination section 221 determines an execution of the next operation when the differential rotation speed ΔN calculated by the rotation speed comparison section 211 becomes the predetermined value or smaller, the differential acceleration ΔA calculated by the angular acceleration comparison section 213 becomes the predetermined value or smaller and the valve state signal SWB from the hydraulic switch 161B which indicates the opened or closed state of the shift valve 157B becomes 1 which represents the open state in such a state that the count execution signal TMB from the malfunction detection timer 217B is 1. In addition, the operation mode shifting determination section 221 also determines an execution of the next operation when the count execution signal TMB from the malfunction detection timer 217B becomes 0 from "1" with the valve state signal SWB continuing to be 0 which represents the closed state although the differential rotation speed ΔN becomes the predetermined value of smaller. The next operation means an operation to open the shift valve 157A of the hydraulic circuit 117.

The valve A opening control section 223 outputs an open control signal to open the shift valve 157A of the hydraulic circuit 117 when the operation mode shifting determination section 221 determines the execution of the next operation. This open control signal is sent to the shift solenoid 159A of the hydraulic circuit 117. The shift solenoid 159A is energized by the open control signal, whereby the shift valve 157A is opened.

The malfunction detection timer 225A counts a predetermined time from a point in time when the valve A opening control section 223 outputs the open control signal. A count execution signal TMA is outputted from the malfunction detection timer 225A. The count execution signal TMA is represented by "1" or "0." In the case where the count execution signal TMA is "1," it indicates that the malfunction detection timer 225A is counting, whereas in the case where the count execution signal TMA is "0," it indicates that the malfunction detection timer 225A has completed counting.

The malfunction detection section 227A determines that the shift valve 157A or the hydraulic switch 161A of the hydraulic circuit 117 malfunctions (an off malfunction) in the case where the count execution signal TMA from the malfunction detection timer 225A becomes "0" from "1" with a valve state signal SWA from the hydraulic switch 161A which indicates an opened or closed state of the shift valve 157A continuing to be "0" which indicates the closed state. Namely, it is not a normal situation that the malfunction detection timer 225A ends counting with the valve state signal SWA continuing to be "0" which indicates the closed state although the shift valve 157A is controlled to be opened. Therefore, the malfunction detection section 227A detects from this situation that the shift valve 157A or the hydraulic switch 161A of the hydraulic circuit 117 malfunctions (an off malfunction).

Figure 8:
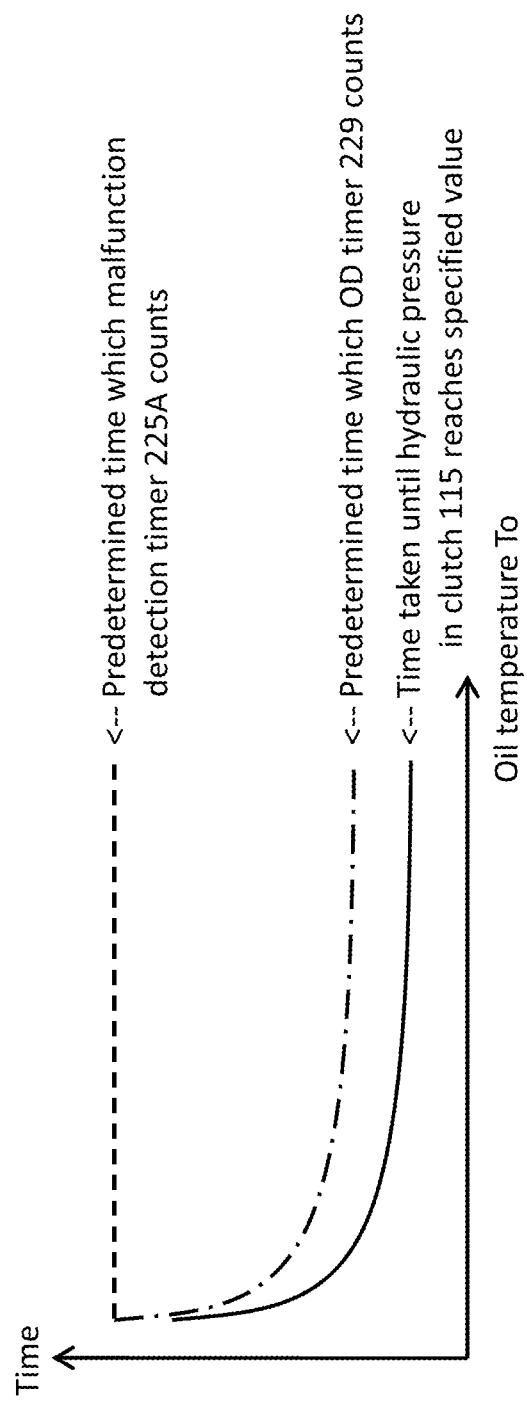
FIG. 8 is a graph showing a relationship among a response time of a working oil to the oil temperature To, a counting time of an OD timer 229, and a counting time of a malfunction detection timer 225A and the malfunction detection timer 217B.

The OD timer 229 counts a predetermined time from a point in time when the valve A opening control section 223 outputs the open control signal. The predetermined time which the OD timer 229 counts differs according to the oil temperature To in the hydraulic circuit 117 and is set to be longer as the oil temperature To becomes lower. This is because a delay in response is generated in control hydraulic pressure generated by the oil pump 151 being driven due to the viscosity of the working oil being high when the oil temperature To is low. FIG. 8 is a graph showing a relationship between the oil temperature To and a time taken until a hydraulic pressure generated in the clutch 115 reaches a specified value, the predetermined time which the OD timer 229 counts and the predetermined time which the malfunction detection timer 225A counts. A count execution signal TMOD is outputted from the OD timer 229. The count execution signal TMOD is represented by "1" or "0." In the case where the count execution signal TMOD is "1," it indicates that the OD timer 229 is counting, whereas in the case where the count execution signal TMOD is "0," it indicates that the OD timer 229 has completed counting.

The torque shifting determination section 231 determines that the clutch 115 is applied so that the drive source which applies torque to the drive shaft 127 of the vehicle is to be shifted from the motor 107 to the internal combustion engine 109 in the case where the valve state signal SWA from the hydraulic switch 161A which represents the opened or closed state of the shift valve 157A is "1" which indicates the open state at a point in time when the count execution signal TMOD from the OD timer 229 becomes "0" from "1."

Figure 9:
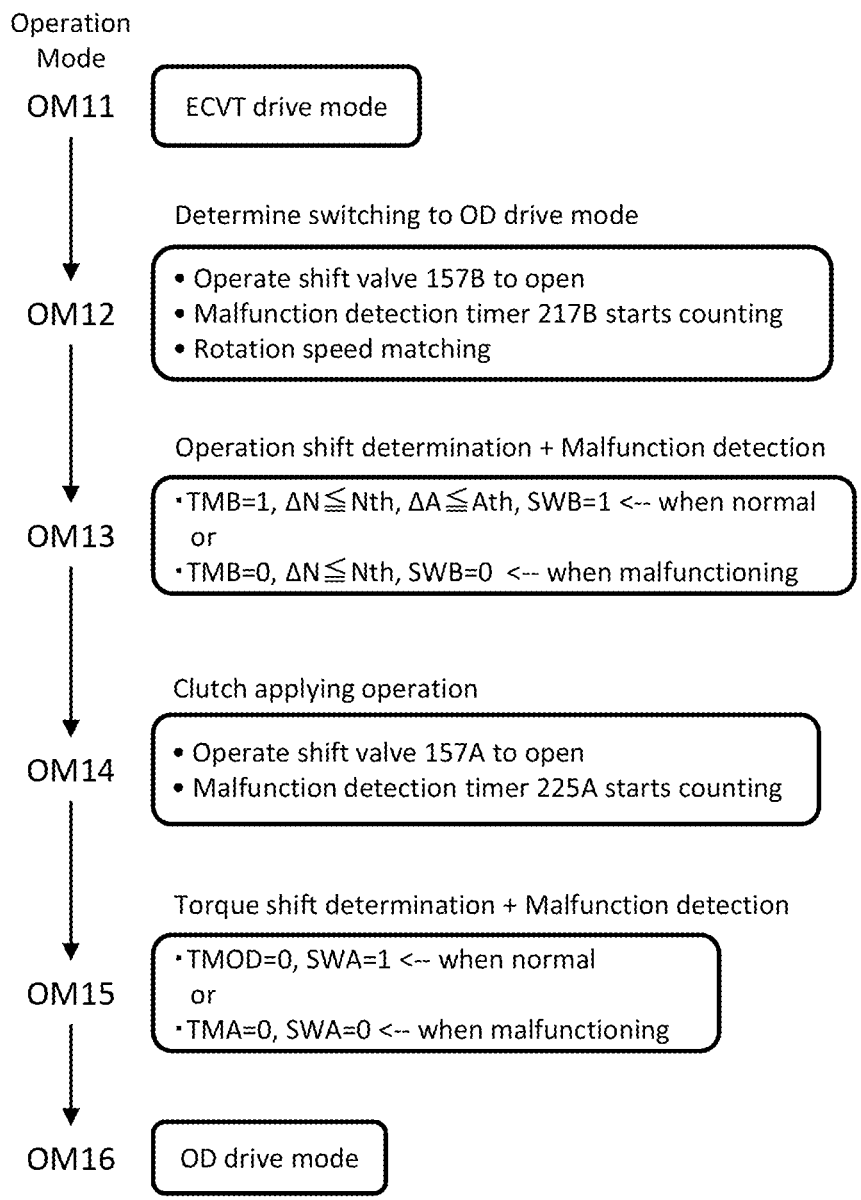
FIG. 9 is a diagram showing a transition of an operation mode when a drive mode of the vehicle is switched from the "ECVT drive mode" to the "OD drive mode."

FIG. 9 is a diagram showing a transition of an operation mode when the drive mode of the vehicle is switched from the "ECVT drive mode" to the "OD drive mode." In an operation mode OM11, the drive mode of the vehicle is set to the ECVT drive mode. As this occurs, in the case where the drive mode determination section 201 determines a switching to the OD drive mode, in an operation mode OM12, the valve B opening control section 215 outputs an open control signal to open the shift valve 157B, the malfunction detection timer 217B starts the predetermined time counting, and the internal combustion engine operation control section 203 executes the rotation speed matching of the internal combustion engine 109.

Next, in an operation mode OM13, the operation mode shifting determination section 221 determines an execution of the next operation in the case where conditions for proceeding to the next operation mode shown in FIG. 9 are satisfied. As this occurs, the malfunction detection section 219B determines that the shift valve 157B or the hydraulic switch 161B of the hydraulic circuit 117 malfunctions (an off malfunction) in the case where the differential rotation speed ΔN is equal to or smaller than the predetermined value (ΔN≤Nth), and the count execution signal TMB becomes "0" (TMB=0) with the valve state signal SWB continuing to be 0 which indicates the closed state (SWB=0).

Next, in an operation mode OM14, the valve A opening control section 223 outputs an open control signal to open the shift valve 157A to apply the clutch 115, and the malfunction detection timer 225A and the OD timer 229 start individually counting their predetermined times. Next, in an operation mode OM15, the torque shifting determination section 231 determines that the allocated drive source to be used to drive the vehicle is to be shifted from the motor 107 to the internal combustion engine 109 in the case where the valve state signal SWA is "1" which indicates the open state at a point in time when the count execution signal TMOD from the OD timer 229 becomes "0" from "1." As this occurs, the malfunction detection section 227A determines that the shift valve 157A or the hydraulic switch 161A of the hydraulic circuit 117 malfunctions (an off malfunction) in the case where the count execution signal TMA becomes 0 (TMA=0) with the valve state signal SWA continuing to be "0 (SWA=0)" which indicates the closed state.

Finally, in an operation mode OM16, the clutch 115 is applied completely, and the drive mode of the vehicle is eventually switched to the OD drive mode in which the vehicle is driven by means of the driving force from the internal combustion engine 109.

In this way, the off malfunction detection of the hydraulic circuit 117 is executed by making use of the malfunction detection timers 225A, 217B in the midst of shifting of the operation modes when the clutch 115 is applied to switch the drive mode from the ECVT drive mode to the OD drive mode. However, in the case where no malfunction is present in the hydraulic circuit 117, the shifting of the operation modes is executed quickly without waiting for the passage of the predetermined times during which the malfunction detection times 225A, 217B execute their countings. Consequently, the quick application of the clutch 115 can be realized while the malfunction detection of the hydraulic circuit 117 is executed accurately.

In the event that the off malfunction of the hydraulic circuit 117 is detected by the malfunction detection timers 225A, 217B of the management ECU 125, the management ECU 125 restricts the switching of the drive modes accompanied by the engagement or disengagement of the clutch 115 from the shifting of the drive modes taking place at this point in time on.

As has been described above, the malfunction detection section 219B detects the off malfunction of the shift valve 157B or the hydraulic switch 161B of the hydraulic circuit 117. When the valve A opening control section 223 opens the shift valve 157A after the malfunction detection section 219B detects the off malfunction, in the case where the hydraulic switch 161A is kept opened at the end of counting by the malfunction detection timer 225A, it can be determined that the hydraulic switch 161B off-malfunctions, whereas in the case where the hydraulic switch 161A is kept closed, it can be determined that the shift valve 157B off-malfunctions.

Additionally, the malfunction detection section 227A detects the off malfunction of the shift valve 157A or the hydraulic switch 161A of the hydraulic circuit 117. In the case where a differential rotation is generated in the clutch 115 when the torque shifting determination section 231 starts the torque source shifting from the motor 107 to the internal combustion engine 109 after the malfunction detection section 227A detects the off malfunction, it can be determined that the shift valve 157A off-malfunctions, whereas in the case where no such differential rotation is generated, it can be determined that the hydraulic switch 161A off-malfunctions.

(Malfunction Detection when Clutch is Released)

Figure 10:
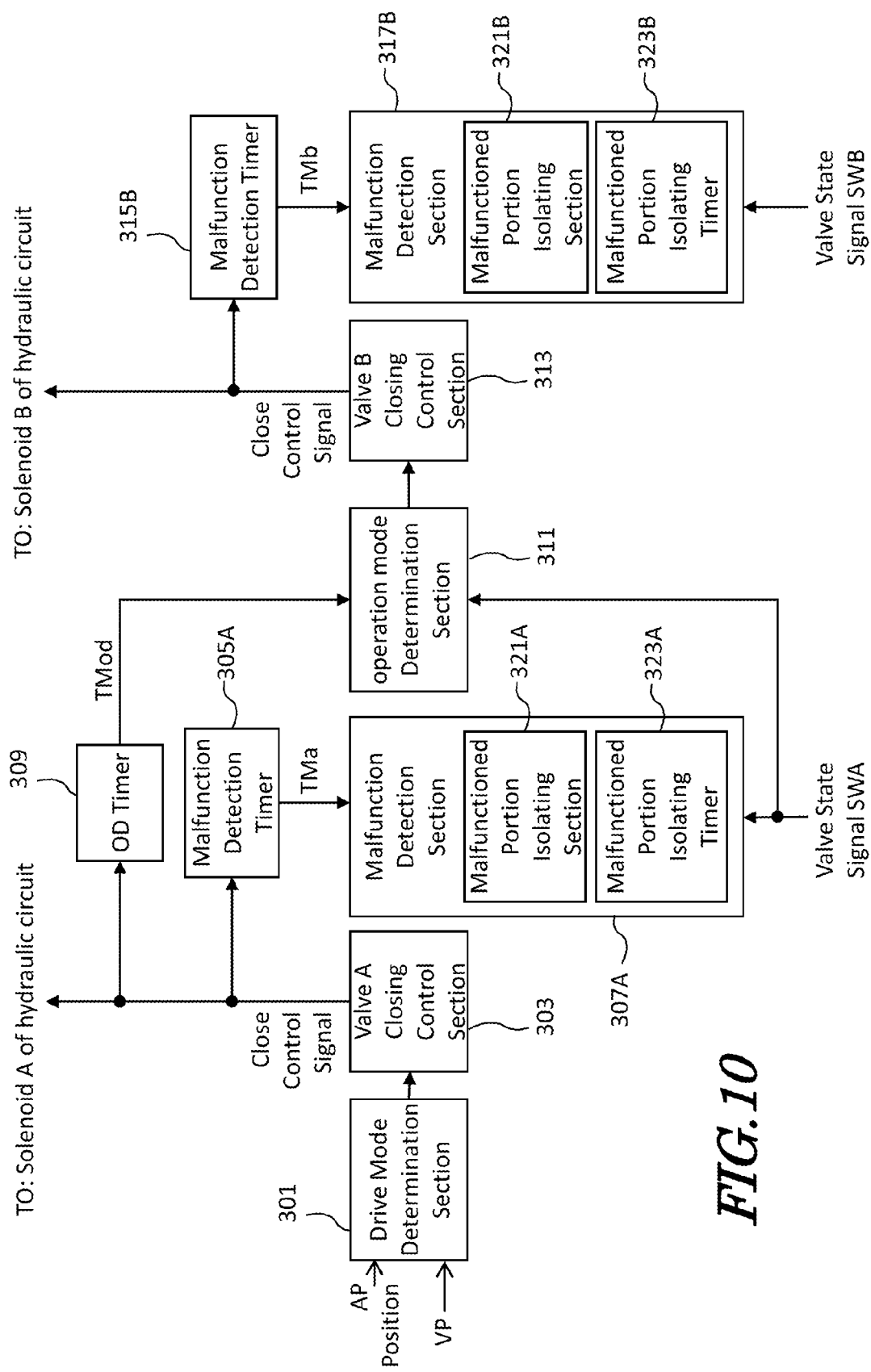
FIG. 10 is a block diagram showing an internal configuration of the management ECU 125 of the first embodiment which executes a malfunction detection of the hydraulic circuit 117 when the clutch 115 is released.

FIG. 10 is a block diagram showing an internal configuration of the management ECU 125 of the first embodiment which executes a malfunction detection of the hydraulic circuit 117 when the clutch 115 is released. As shown in FIG. 10, the management ECU 125 includes a drive mode determination section 301, a valve A closing control section 303, a malfunction detection timer 305A, a malfunction detection section 307A, an OD timer 309, an operation mode shifting determination section 311, a valve B closing control section 313, a malfunction detection timer 315B and a malfunction detection section 317B.

The drive mode determination section 301 determines the drive mode of the vehicle to be anyone of the "EV drive mode," the "ECVT drive mode," and the "OD drive mode" based on an accelerator pedal position (AP position) and a vehicle speed VP. The configuration of the management ECU 125 shown in FIG. 10 is one when the drive mode is switched from the OD drive mot to the ECVT drive mode, and therefore, the drive mode determination section 301 shown in FIG. 10 determines that the drive mode of the vehicle is the "ECVT drive mode."

The valve A closing control section 303 outputs a close control signal which closes the shift valve 157A of the hydraulic circuit 117 in the event that the drive mode determination section 301 determines that the drive mode is to be switched to the ECVT drive mode when the drive mode of the vehicle is the OD drive mode. This close control signal is sent to the shift solenoid 159A of the hydraulic circuit 117. The shift solenoid 159A is deenergized by the close control signal, whereby the shift valve 157A is closed.

The malfunction detection timer 305A executes counting for a predetermined time from a point in time when the valve A closing control section 303 outputs the close control signal. A count execution signal TMa is outputted from the malfunction detection timer 305A. The count execution signal TMa is represented by "1" or "0." In the case where the count execution signal TMa is "1," it indicates that the malfunction detection timer 305A is counting, whereas in the case where the count execution signal TMa is "0," it indicates that the malfunction detection timer 305A has completed counting.

The malfunction detection section 307A determines that the shift valve 157A or the hydraulic switch 161A of the hydraulic circuit 117 malfunctions (an on malfunction) in the case where the count execution signal TMa from the malfunction detection timer 305A becomes 0 from "1" with a valve state signal SWA from the hydraulic switch 161A which indicates an opened or closed state of the shift valve 157A continuing to be "1" which indicates the open state. Namely, it is not a normal situation that the malfunction detection timer 305A ends counting with the valve state signal SWA continuing to be 1 which indicates the open state although the shift valve 157A is controlled to be closed. Therefore, the malfunction detection section 307A detects from this situation that the shift valve 157A or the hydraulic switch 161A of the hydraulic circuit 117 malfunctions (an on malfunction).

Figure 11:
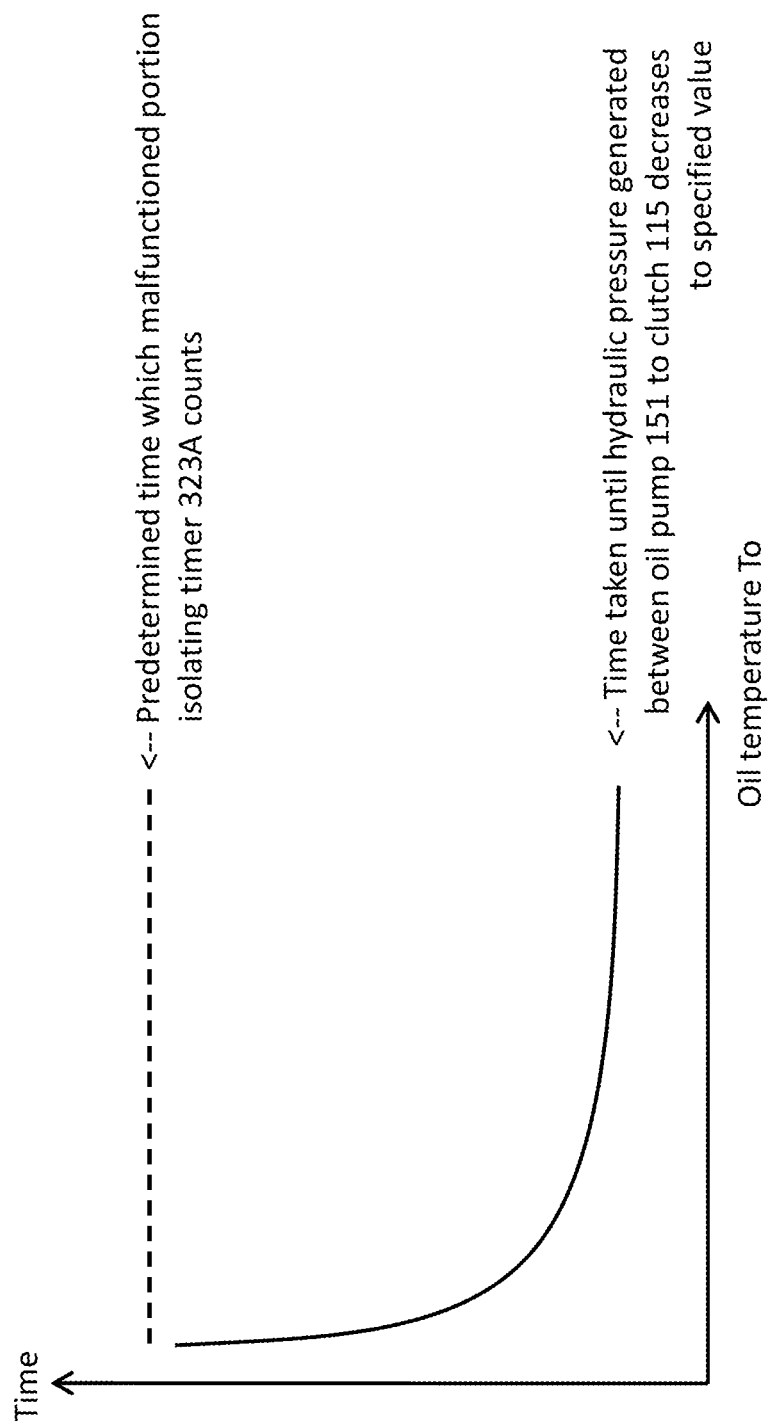
FIG. 11 is a graph showing a relationship between the oil temperature To and a time taken until a hydraulic pressure generated from an oil pump 151 to the clutch 115 decreases to a specified value and a predetermined time during which a malfunctioned portion isolating timer 323A executes counting, when the oil pump 151 stops.

As shown in FIG. 10, the malfunction detection section 307A has a malfunctioned portion isolating section 321A and a malfunctioned portion isolating timer 323A. The malfunctioned portion isolating timer 323A counts a predetermined time in the case where the operation of the internal combustion engine 109 has been stopped from a point in time when the malfunction detection section 307A determines that the shift valve 157A or the hydraulic switch 161A on-malfunctions. FIG. 11 is a graph showing a relationship between the oil temperature To and a time taken until a hydraulic pressure generated from the oil pump 151 to the clutch 115 decreases to a specified value and the predetermined time which the malfunctioned portion isolating timer 323A counts, when the oil pump 151 stops. The malfunctioned portion isolating section 321A determines that although the shift valve 157A is normal, the hydraulic switch 161A on-malfunctions in the case where the signal from the hydraulic switch 161A indicates the on state at a point in time when the malfunctioned portion isolating timer 323A ends counting, whereas in the case where the signal from the hydraulic switch 161A indicates the off state, the malfunctioned portion isolating section 321A determines that although the hydraulic switch 161A is normal, the shift valve 157A on-malfunctions.

Figure 12:
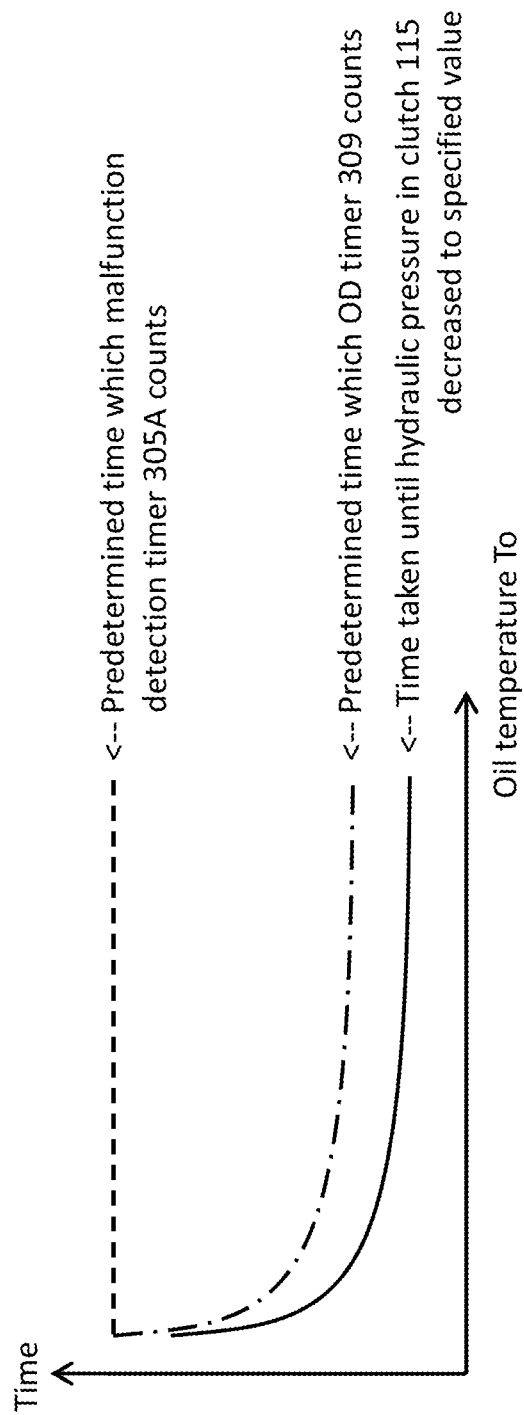
FIG. 12 is a graph showing a relationship between the oil temperature To and a time taken until a hydraulic pressure generated in the clutch 115 decreases to a specified value, a predetermined time during which an OD timer 309 executes counting and a predetermined time during which a malfunction detection timer 305A executes counting.

The OD timer 309 counts a predetermined time from a point in time when the valve A closing control section 303 outputs the close control signal. As with the OD timer 309 that the management ECU 125 includes in FIG. 5, the predetermined time which the OD timer 309 counts differs depending upon the oil temperature To of the hydraulic circuit 117 and is set to be longer as the oil temperature To becomes lower. FIG. 12 is a graph showing a relationship between the oil temperature To and a time taken until a hydraulic pressure generated in the clutch 115 decreases to a specified value, the predetermined time which the OD timer 309 counts and the predetermined time which the malfunction detection timer 305A counts. A count execution signal TMod is outputted from the OD timer 309. The count execution signal TMod is represented by "1" or "0." In the case where the count execution signal TMod is "1," it indicates that the OD timer 309) is counting, whereas in the case where the count execution signal TMod is "0," it indicates that the OD timer 309 has completed counting.

The operation mode shifting determination section 311 determines an execution of the next operation in the case where the valve state signal SWA from the hydraulic switch 161A which represents the opened or closed state of the shift valve 157A is "0" which represents the closed state at a point in time when the count execution signal TMod from the OD timer 309 is switched from "1" to "0." In addition, the operation mode shifting determination section 311 also determines an execution of the next operation when the count execution signal TMa from the malfunction detection timer 305A is switched from "1" to "0" with the valve state signal SWA continuing to be "1" which represents the open state. The next operation means an operation to close the shift valve 157B of the hydraulic circuit 117.

The valve B closing control section 313 outputs a close control signal to close the shift valve 157B of the hydraulic circuit 117 when the operation mode shifting determination section 311 determines the execution of the next operation. This close control signal is sent to the shift solenoid 159B of the hydraulic circuit 117. The shift solenoid 159B is deenergized by the close control signal, whereby the shift valve 157A is closed.

Figure 13:
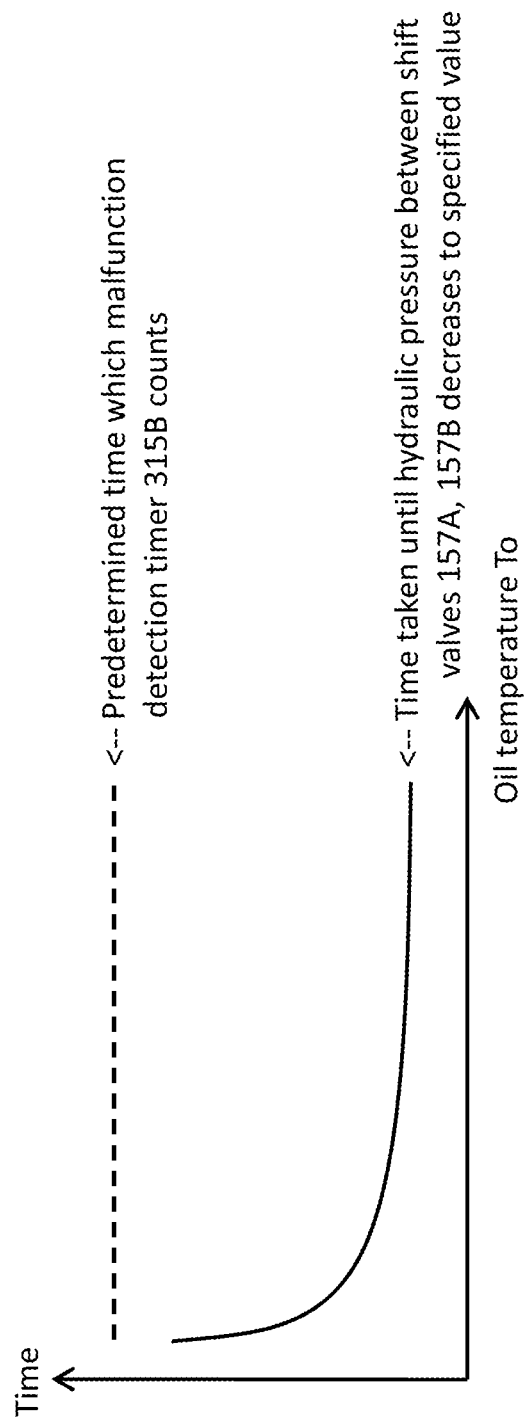
FIG. 13 is a graph showing a relationship between the oil temperature To and a time taken until the hydraulic pressure generated between the shift valves 157A, 157B decreases a specified value and a predetermined time during which a malfunction detection timer 315B executes counting.

The malfunction detection timer 315B counts a predetermined time from a point in time when the valve B closing control section 313 outputs the close control signal. FIG. 13 is a graph showing a relationship between the oil temperature To and a time taken until the hydraulic pressure generated between the shift valves 157A, 157B decreases a specified value and the predetermined time which the malfunction detection timer 315B counts. As shown in FIG. 13, the predetermined time which the malfunction detection timer 315B counts is the time based on the cryogenic response of the hydraulic pressure in the hydraulic circuit 117 and is the time which is sufficient for the hydraulic switch 161B to detect that the shift valve 157B is closed from when the shift valve 157B is operated to be closed with the shift valve 157A staying off and the shift valve 157B staying off. A count execution signal TMb is outputted from the malfunction detection timer 315B. The count execution signal TMb is represented by "1" or "0." In the case where the count execution signal TMb is "1," it indicates that the malfunction detection timer 315B is counting, whereas in the case where the count execution signal TMb is "0," it indicates that the malfunction detection timer 315B has completed counting.

The malfunction detection section 317B determines that the shift valve 157B or the hydraulic switch 161B of the hydraulic circuit 117 malfunctions (an on malfunction) in the case where the count execution signal TMb from the malfunction detection timer 315B becomes "0" from 1 with the valve state signal SWB from the hydraulic switch 161B which indicates the opened or closed state of the shift valve 157B continuing to be "1" which indicates the open state. Namely, it is not a normal situation that the malfunction detection timer 315B ends counting with the valve state signal SWB continuing to be 1 which indicates the open state although the shift valve 157B is controlled to be closed. Therefore, the malfunction detection section 317B detects from this situation that the shift valve 157B or the hydraulic switch 161B of the hydraulic circuit 117 malfunctions (an on malfunction).

Figure 14:
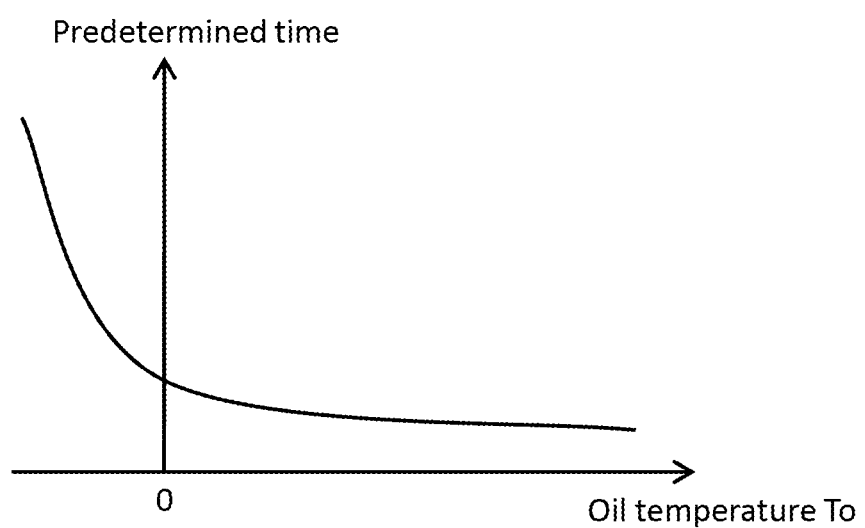
FIG. 14 is a graph showing a relationship between the predetermined time which the malfunction detection timer 315B counts and the oil temperature.

The time necessary for the malfunction detection section 317B to detect the closed state of the shift valve 157B differs depending upon the temperature (the oil temperature) of the working oil in the hydraulic circuit 117. Namely, since the lower the oil temperature, the higher the viscosity of the working oil, the lower the oil temperature, the longer the sufficient time. Therefore, the predetermined time which the malfunction detection timer 315B counts is the time taken from when the shift valve 157B is operated to be closed until the hydraulic switch 161B can detect the closed state of the shift valve 157B and may be the time which is set to be longer as the oil temperature becomes lower. FIG. 14 is a graph showing a relationship between the predetermined time which the malfunction detection tinier 315B counts and the oil temperature. As shown in FIG. 14, in the event that the oil temperature is equal to or higher than normal temperatures, the predetermined time is set shorter than when the oil temperature is extremely low. Consequently, the malfunction detection by the malfunction detection section 317B can be executed quickly and accurately according to the oil temperature.

Figure 15:
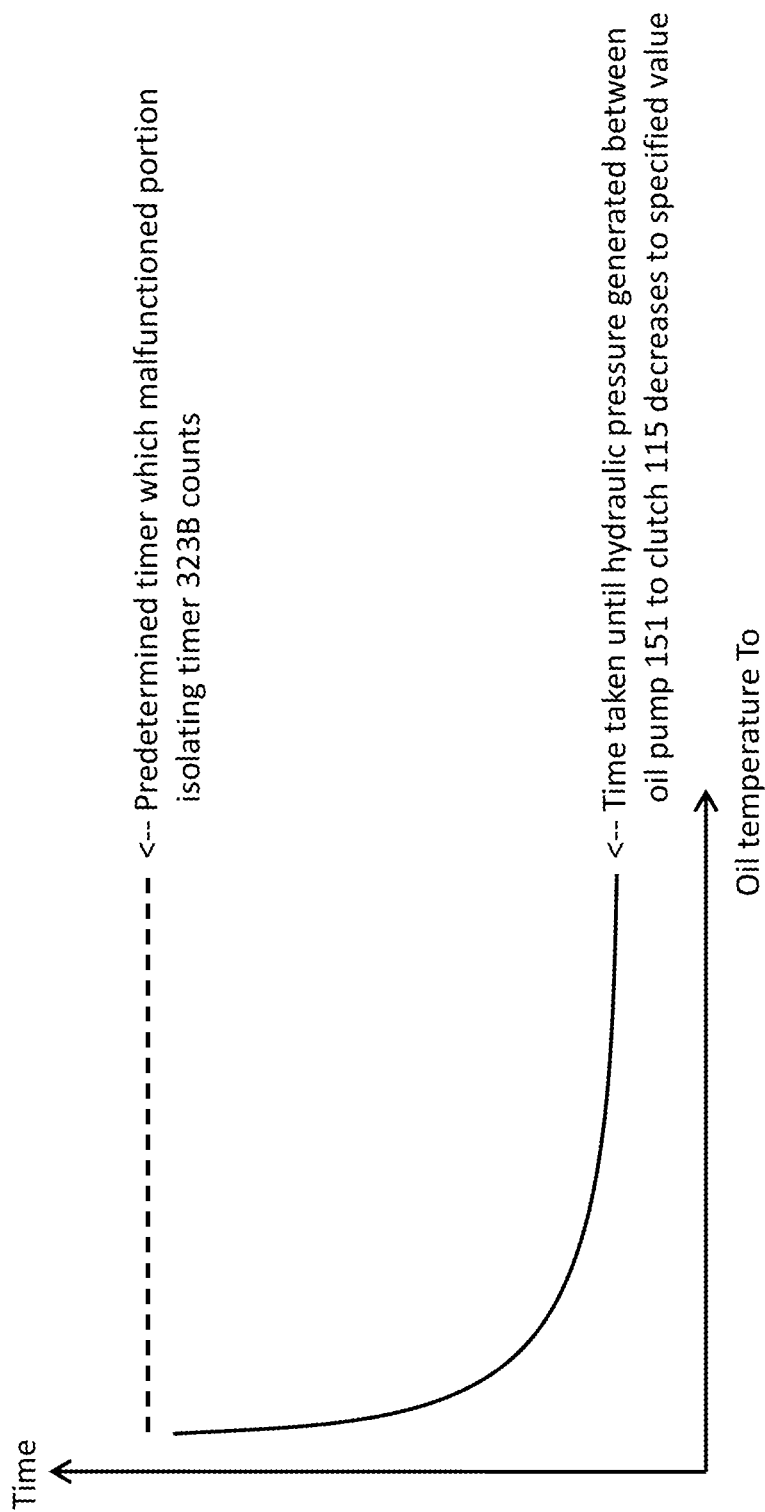
FIG. 15 is a graph showing a relationship between the oil temperature To and a time taken until the hydraulic pressure generated from the oil pump 151 to the clutch 115 decreases to the specified value and a predetermined time which a malfunctioned portion isolating timer 323B counts, when the oil pump 151 stops.

As shown in FIG. 10, the malfunction detection section 317B has a malfunctioned portion isolating section 321B and a malfunctioned portion isolating timer 323B. The malfunctioned portion isolating timer 323B executes counting for a predetermined time in the case where the operation of the internal combustion engine 109 has been stopped from a point in time when the malfunction detection section 317B determines that the shift valve 157B or the hydraulic switch 161B on-malfunctions. FIG. 15 is a graph showing a relationship between the oil temperature To and a time taken until the hydraulic pressure generated from the oil pump 151 to the clutch 115 decreases to a specified value and the predetermined time which the malfunctioned portion isolating timer 323B counts, when the oil pump 151 stops. The malfunctioned portion isolating section 321B determines that although the shift valve 157B is normal, the hydraulic switch 161B on-malfunctions in the case where the signal from the hydraulic switch 161B indicates the on state at a point in time when the malfunctioned portion isolating timer 323B ends counting, whereas in the case where the signal from the hydraulic switch 161B indicates the off state, the malfunctioned portion isolating section 321B determines that although the hydraulic switch 161B is normal, the shift valve 157B on-malfunctions.

The predetermined time which the malfunctioned portion isolating timer 323B counts is the time based on the cryogenic response of the hydraulic pressure in the hydraulic circuit 117 and is the time which is sufficient for the hydraulic switch 161B to detect that the shift valve 157B is opened from when the shift valve 157B is operated to be opened. However, in the case where both the shift valves 157A, 157B on-malfunction when the oil temperature is extremely low, the valve A opening control section 223 and the valve B opening control section 215 execute an open control, the working oil only leaks from gaps of the shift valves 157A, 157B, and since the viscosity of the working oil is high, it takes a very long time before the hydraulic pressure decreases. Consequently, a very long time is set as the predetermined time which the malfunctioned portion isolating timer 323B counts. On the other hand, in the case where the predetermined time is set to be shorter than this very long time, there will be a high possibility that an erroneous detection is caused.

Figure 16:
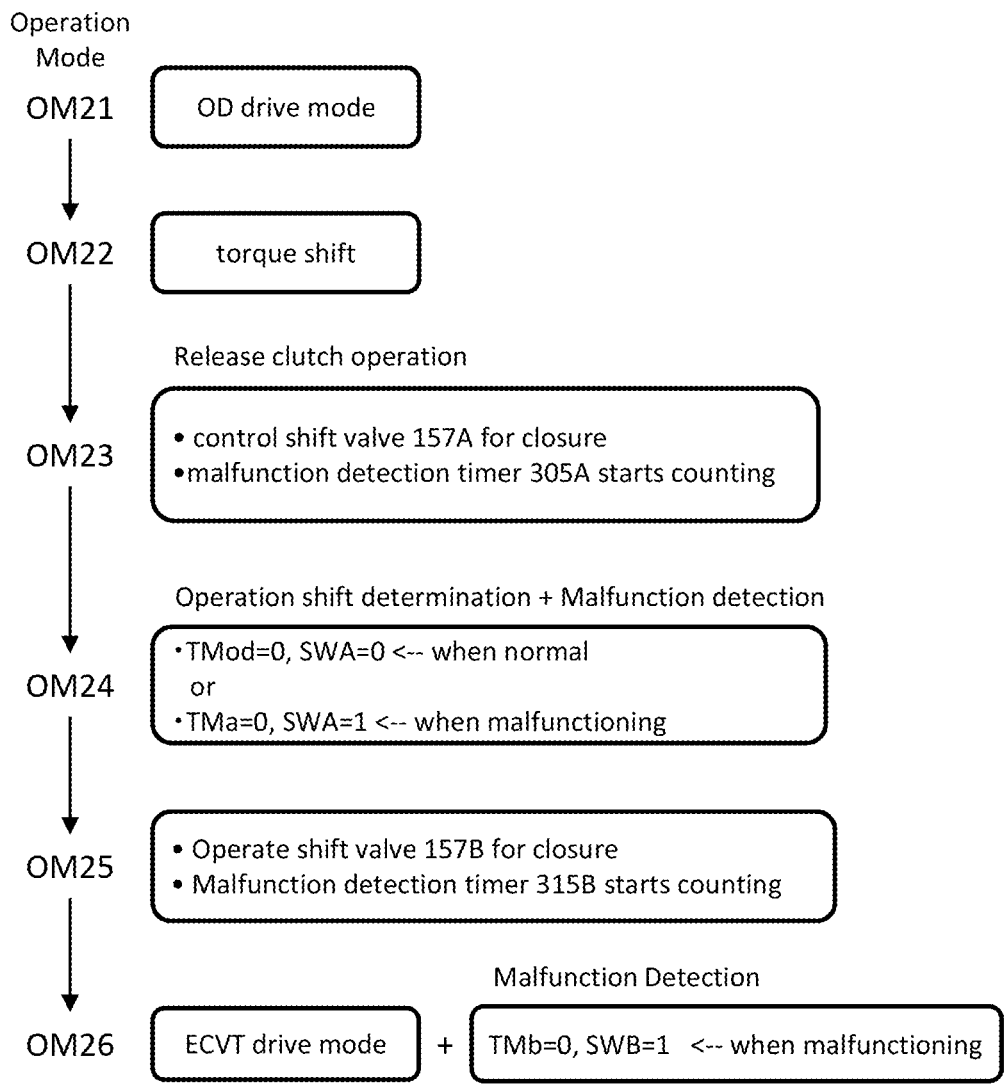
FIG. 16 is a diagram showing a transition of an operation mode when the drive mode of the vehicle is switched from the "OD drive mode" to the "ECVT drive mode."

FIG. 16 is a diagram showing a transition of an operation mode when the drive mode of the vehicle is switched from the "OD drive mode" to the "ECVT drive mode." In an operation mode OM21, the drive mode of the vehicle is set to the OD drive mode. As this occurs, when the drive mode determination section 301 determines a switching to the ECVT drive mode, in an operation mode OM22, the allocated drive source to be used to drive the vehicle is shifted from the internal combustion engine 109 to the motor 107. Next, in an operation mode OM23, the valve A closing control section 303 outputs a close control signal to close the shift valve 157A, and the malfunction detection timer 305A starts counting its predetermined time.

Next, in an operation mode OM24, the operation mode shifting determination section 311 determines an execution of the next operation in the case where conditions for proceeding to the next operation mode shown in FIG. 16 are satisfied. As this occurs, the malfunction detection section 307A determines that the shift valve 157A or the hydraulic switch 161A of the hydraulic circuit 117 malfunctions (an on malfunction) in the case where the count execution signal TMa becomes "0 (TMa=0)" with the valve state signal SWA continuing to be "1 (SWA=1)" which indicates the open state.

Next, in an operation mode OM25, the valve B closing control section 313 outputs a close control signal to close the shift valve 157B, and the malfunction detection timer 315B starts its predetermined time counting. Finally, in an operation mode OM26, the drive mode is eventually switched to the ECVT drive mode, and the malfunction detection section 317B determines that the shift valve 157B or the hydraulic switch 161B of the hydraulic circuit 117 malfunctions (an on malfunction) in the case where the count execution signal TMb becomes 0 (TMb=0) with the valve state signal SWB continuing to be "1 (SWB=1)" which represents the open state.

In this way, the on malfunction detection of the hydraulic circuit 117 is executed by making use of the malfunction detection timers 305A, 315B since the two shift valves of the hydraulic circuit 117 are sequentially operated to be closed during the shifting of the operation modes to release the clutch 115 when the drive mode is switched from the OD drive mode to the ECVT drive mode. Consequently, the malfunction detection of the hydraulic circuit 117 can be executed accurately also when the clutch 115 is released.

In the event that the on malfunction of the hydraulic circuit 117 is detected by the malfunction detection timers 305A, 315B of the management ECU 125, the management ECU 125 restricts the switching of the drive modes accompanied by the engagement or disengagement of the clutch 115 from the shifting of the drive modes taking place at this point in time on.

As has been described above, the malfunction detection section 307A detects the on malfunction of the shift valve 157A or the hydraulic switch 161A of the hydraulic circuit 117. When the valve B closing control section 313 closes the shift valve 157B after the malfunction detection section 307A detects the on malfunction, in the case where the hydraulic switch 161B is kept closed at the end of counting by the malfunction detection timer 315B, it can be determined that the hydraulic switch 161A on-malfunctions.

In this embodiment, although the hydraulic circuit 117 is described as including the hydraulic switches 161A, 161B, the hydraulic circuit 117 may include hydraulic sensors in place of the hydraulic switches. As this occurs, the hydraulic sensors determine that the shift valves are open in the case where hydraulic pressures are equal to or larger than thresholds, whereas in the case where the hydraulic pressures are smaller than the thresholds, the hydraulic sensors determine that the shift valves are closed.

While the invention has been described in detail and by reference to the specific embodiment, it is obvious to those skilled in the art to which the invention pertains that various alterations or modifications can be made thereto without departing from the spirit and scope of the invention.

This patent application is based on the Japanese Patent Application (No. 2012-244400) filed on Nov. 6, 2012, the contents of which are incorporated herein by reference.

DESCRIPTION OF REFERENCE NUMERALS AND CHARACTERS 101 battery (BATT)
103 converter (CONV)
105 first inverter (first INV)
107 motor (Mot)
109 internal combustion engine (ENG)
111 generator (GEN)
113 second inverter (second INV)
115 lock-up clutch (clutch)
117 hydraulic circuit
119 gearbox (gear)
121 vehicle speed sensor
123 rotation speed sensor
125 management ECU (MG ECU)
151 oil pump
153 oil tank
155 regulator valve
157A, 157B shift valve
159A, 159B shift solenoid
161A, 161B hydraulic switch
163 oil temperature sensor
201 drive mode determination section
203 internal combustion engine operation control section
205 motor rotation speed acquiring section
207 motor angular acceleration calculation section
209 internal combustion engine angular acceleration calculation section
211 rotation speed comparison section 213 angular acceleration comparison section
215 valve B opening control section
217B malfunction detection timer
219B malfunction detection section
221 operation mode shifting determination section
223 valve A opening control section
225A malfunction detection timer
227A malfunction detection section
229 OD timer
231 torque shifting determination section
301 drive mode determination section
303 valve A closing control section
305A malfunction detection timer
307A malfunction detection section
309 OD timer
311 operation mode shifting determination section
313 valve B closing control section
315B malfunction detection timer
317B malfunction detection section
321A, 321B malfunctioned portion isolating section
323A, 323B malfunctioned portion isolating timer

The invention claimed is:

1. A malfunction detection apparatus for an engaging and disengaging controller that supplies a working oil of a predetermined pressure to an engaging and disengaging mechanism which engages and disengages a power transmission path to control engagement and disengagement of the power transmission path,
wherein the engaging and disengaging controller comprises:
a valve for opening and closing a flow path of the working oil to the engaging and disengaging mechanism; and
an opening/closing detection section which detects an opened or closed state of the valve, and
wherein the malfunction detection apparatus comprises:
an opening/closing control section which controls the valve of the engaging and disengaging controller to be opened or closed;
a time counting section which counts a predetermined time from a start of an opening/closing control by the opening/closing control section; and
a malfunction detection section which determines that the engaging and disengaging controller malfunctions in a case where the time counting section ends counting of the predetermined time in a state that detection results by the opening/closing detection section of the engaging and disengaging controller do not coincide with control details executed by the opening/closing control section.

2. The malfunction detection apparatus according to claim 1,
wherein the predetermined time is a time which is equal to or longer than a time taken from when the valve is controlled to be opened or closed until the opening/closing detection section can detect an open state or a closed state of the valve, irrespective to a temperature of the working oil in the engaging and disengaging controller.

3. The malfunction detection apparatus according to claim 1,
wherein in the engaging and disengaging controller, a plurality of the valves are provided in series on the flow path of the working oil, and a plurality of the opening/closing detection sections are provided corresponding to each of the valves, and
wherein when the engaging and disengaging mechanism is applied, in the malfunction detection apparatus,
the opening and closing control section controls the valves to be opened sequentially from those provided upstream of the flow path,
the time counting section counts the predetermined time from the start of an opening control by the opening and closing control section every time each valve is controlled to be opened, and
the malfunction detection section determines that the valve of the engaging and disengaging controller which is controlled to be opened or the opening/closing detection section corresponding to that valve malfunctions in a case where the time counting section ends counting of the predetermined time in a state that detection results by the opening/closing detection section do not coincide with control details executed by the opening/closing control section every time each valve is controlled to be opened.

4. The malfunction detection apparatus according to claim 1,
wherein in the engaging and disengaging controller, a plurality of the valves are provided in series on the flow path of the working oil, and a plurality of opening/closing detection sections are provided corresponding to each of the valves, and
wherein when the engaging and disengaging mechanism is released, in the malfunction detection apparatus,
the opening and closing control section controls the valves to be closed sequentially from those provided downstream of the flow path,
the time counting section counts the predetermined time from the start of a closing control by the opening and closing control section every time each valve is controlled to be closed, and
the malfunction detection section determines that the valve of the engaging and disengaging controller which is controlled to be closed or the opening/closing detection section corresponding to that valve malfunctions in a case where the time counting section ends counting of the predetermined time in a state that detection results by the opening/closing detection section do not coincide with control details executed by the opening/closing control section every time each valve is controlled to be closed.

5. The malfunction detection apparatus according to claim 1,
wherein the predetermined time is a time which is equal to or longer than a time taken from when the valve is controlled to be opened or closed until the opening/closing detection section can detect an open state or a closed state of the valve, and is a time which is set to be longer as a temperature of the working oil in the engaging and disengaging controller becomes lower.

6. A hybrid vehicle, comprising:
an internal combustion engine;
a generator which is driven by the internal combustion engine to generate electric power;
a battery which supplies electric power to a motor;
the motor which is connected to drive wheels and which is driven by means of electric power supplied from at least either of the battery and the generator;
an engaging and disengaging mechanism which engages and disengages a power transmission path from the internal combustion engine to the drive wheels, and which can transmit rotational power from the internal combustion engine to the drive wheels when the an engaging and disengaging mechanism is engaged;

an engaging and disengaging controller which supplies a working oil of predetermined pressure to the engaging and disengaging mechanism to control engagement or disengagement of the power transmission path; and the malfunction detection apparatus according to claim 1, wherein the hybrid vehicle drives by means of power from the motor or the internal combustion engine, and wherein in shifting the hybrid vehicle from a drive mode in which the motor is used as a drive source to a drive mode in which the internal combustion engine is used as a drive source, the malfunction detection apparatus operates when the valve of the engaging and disengaging controller is operated to be opened to apply the engaging and disengaging mechanism.

7. The hybrid vehicle according to claim 6, wherein in shifting the hybrid vehicle from the drive mode in which the internal combustion engine is used as a drive source to the drive mode in which the motor is used as a drive source, the malfunction detection apparatus operates when the valve of the engaging and disengaging controller is operated to be closed to release the engaging and disengaging mechanism.

* * * * *